United States Patent
Kan et al.

(10) Patent No.: US 9,774,692 B2
(45) Date of Patent: Sep. 26, 2017

(54) METHOD AND SYSTEM OF AUTOMATIC RECORDING AND PORTABLE APPLICATION OF LIFESTYLE RELATED DATA

(71) Applicant: MediaTek Inc., Hsinchu (TW)

(72) Inventors: Tai-Wei Kan, Taipei (TW); Tsung-Te Wang, Taipei (TW); Yi-Kai Lee, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 218 days.

(21) Appl. No.: 14/688,948

(22) Filed: Apr. 16, 2015

(65) Prior Publication Data

US 2016/0308987 A1    Oct. 20, 2016

(51) Int. Cl.
*H04L 29/08* (2006.01)
*H04L 12/26* (2006.01)
*H04L 12/64* (2006.01)

(52) U.S. Cl.
CPC .......... *H04L 67/22* (2013.01); *H04L 12/6418* (2013.01); *H04L 43/0876* (2013.01); *H04L 67/125* (2013.01); *H04L 67/18* (2013.01)

(58) Field of Classification Search
CPC .... H04L 67/22; H04L 67/125; H04L 43/0876
USPC .......... 709/223, 224, 226, 227, 229
See application file for complete search history.

(56) References Cited

U.S. PATENT DOCUMENTS

| | | | | |
|---|---|---|---|---|
| 9,607,264 | B2* | 3/2017 | Downs | G06N 3/08 |
| 2005/0250516 | A1* | 11/2005 | Shim | H04W 8/18 |
| | | | | 455/456.1 |
| 2011/0230209 | A1* | 9/2011 | Kilian | H04M 1/72569 |
| | | | | 455/456.3 |
| 2016/0154117 | A1* | 6/2016 | Baudia | G01S 19/34 |
| | | | | 342/357.31 |

OTHER PUBLICATIONS

"Migrating User Profiles to a New Device"—Code 42, Dec. 2013 http://essentials.code42.com/rs/760-OMU-478/images/SB111501_DeviceMigration_Final.pdf.*

* cited by examiner

*Primary Examiner* — Randy Scott
(74) *Attorney, Agent, or Firm* — Han IP Corporation; Andy M. Han (57) ABSTRACT

Methods and systems of automatically recording and porting of lifestyle data are described. A method may involve receiving recorded data from each of a first plurality of networked devices associated with a first location. The recorded data may pertain to usage of one or more of the first plurality of networked devices during a first period of time. The method may also involve storing the recorded data. The method may further involve applying the recorded data to one or more of a second plurality of networked devices associated with a second location different than the first location.

22 Claims, 5 Drawing Sheets

METHOD AND SYSTEM OF AUTOMATIC RECORDING AND PORTABLE APPLICATION OF LIFESTYLE RELATED DATA

TECHNICAL FIELD

The inventive concept described herein is generally related to smart homes and, more particularly, to techniques pertaining to automatic recording and portable application of lifestyle related data.

BACKGROUND

Unless otherwise indicated herein, approaches described in this section are not prior art to the claims listed below and are not admitted to be prior art by inclusion in this section.

Given recent technological development and advancement, more and more appliances in a home and/or office setting may be connected to a network, such as the Internet, to form a so-called Internet of Things (IoT). A home could be equipped with a smart home controller communicatively connected to a number of networked appliances to control the operations of those appliances. For instance, the smart home controller could adjust the room temperature according to personal preference of occupants of the home, and could help reduce consumption of electricity by turning off air conditioning when no one is in a room and turning on air conditioning to a predetermined temperature when the room is occupied. As another example, a home could be equipped with a router communicative connected to the Internet as well as a number of networked appliances so as to allow a user to control those appliances via the router whether at home or remotely when not at home.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, techniques, methods, apparatuses and systems for automatically recording and portable application of lifestyle related data. Advantageously, implementations of the present disclosure allow seamless application of a user's lifestyle, as recorded at one location, to one or more other locations as the user travel from one location to another.

In one aspect, a method may involve receiving recorded data from each of a first plurality of networked devices associated with a first location. The recorded data may pertain to usage of one or more of the first plurality of networked devices during a first period of time. The method may also involve storing the recorded data. The method may further involve applying the recorded data to one or more of a second plurality of networked devices associated with a second location different than the first location.

In another method, an apparatus may include a communication device, a storage device and a processing device. The communication device may be configured to receive first recorded data from a first plurality of networked devices associated with a first location. The first recorded data may pertain to usage of one or more of a first plurality of networked devices during a first period of time. The communication device may also be configured to receive second recorded data pertaining to usage of one or more of a second plurality of networked devices associated with a second location. The storage device may be configured to store at least the first recorded data. The processing device may be coupled to the storage device and the communication device. The processing device may be configured to apply the first recorded data to one or more of the first plurality of networked devices during a second period of time different than the first period of time. The processing device may also be configured to apply at least a portion of the second recorded data to at least one of the first plurality of networked devices during a third period of time different than the first period of time.

In yet another aspect, a system may include a first control apparatus and a second control apparatus. The first control apparatus may be configured to receive first recorded data from a first plurality of networked devices associated with a first location. The second control apparatus may be configured to receive second recorded data from a second plurality of networked devices associated with a second location. The first recorded data may pertain to usage of one or more of the first plurality of networked devices during a first period of time. The second recorded data may pertain to usage of one or more of the second plurality of networked devices during a second period of time. The first control apparatus may be further configured to receive the second recorded data from the second control apparatus and apply at least a portion of the second recorded data to at least one of the first plurality of networked devices. The second control apparatus may be further configured to receive the first recorded data from the first control apparatus and apply at least a portion of the first recorded data to at least one of the second plurality of networked devices.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Overview

Implementations of the present disclosure allow seamless application of a user's lifestyle, as recorded at one location, to one or more other locations as the user travel from one location to another. According to the present disclosure, data pertaining to usage of a number of networked devices, such as appliances and sensors for example, may be automatically recorded over a period of time. The recorded data, e.g., operational parameters, may reflect the lifestyle of user(s) of the networked devices, and may be recorded by each of the networked devices and transmitted to a smart home control apparatus for storage. Alternatively, usage data may be transmitted by a given networked device, during its usage, to the smart home control apparatus for recording. The networked devices may be associated with or otherwise located at a first location, such as a space or a room.

When a user travels from the first location to a second location, e.g., from home to a hotel, the lifestyle of the user may be seamlessly ported to the second location with or without user action or initiation. That is, the recorded data may be applied to one or more networked devices associated with the second location, e.g., by a smart home control apparatus associated with the second location, so that the one or more networked devices associated with the second location may operate in a manner, e.g., in terms of output and time of operation, similar to those networked devices associated with the first location.

For instance, the recorded data from the networked devices associated with the home of a user may reflect the lifestyle of the user in the morning in that the user prefers the following: room temperature be set to 26° C., a cup of coffee be brewed at 8:00 AM, the television be turned on and tuned to a certain news channel, etc. When the user relocates, e.g., moving to a new home, traveling domestically or overseas for leisure or traveling domestically or overseas for business, the lifestyle of the user may be ported to the destination. Specifically, the recorded data may be applied to the networked devices associated with the destination so that those networked devices may operate similarly as with the networked devices at the home of the user.

Figure 1:
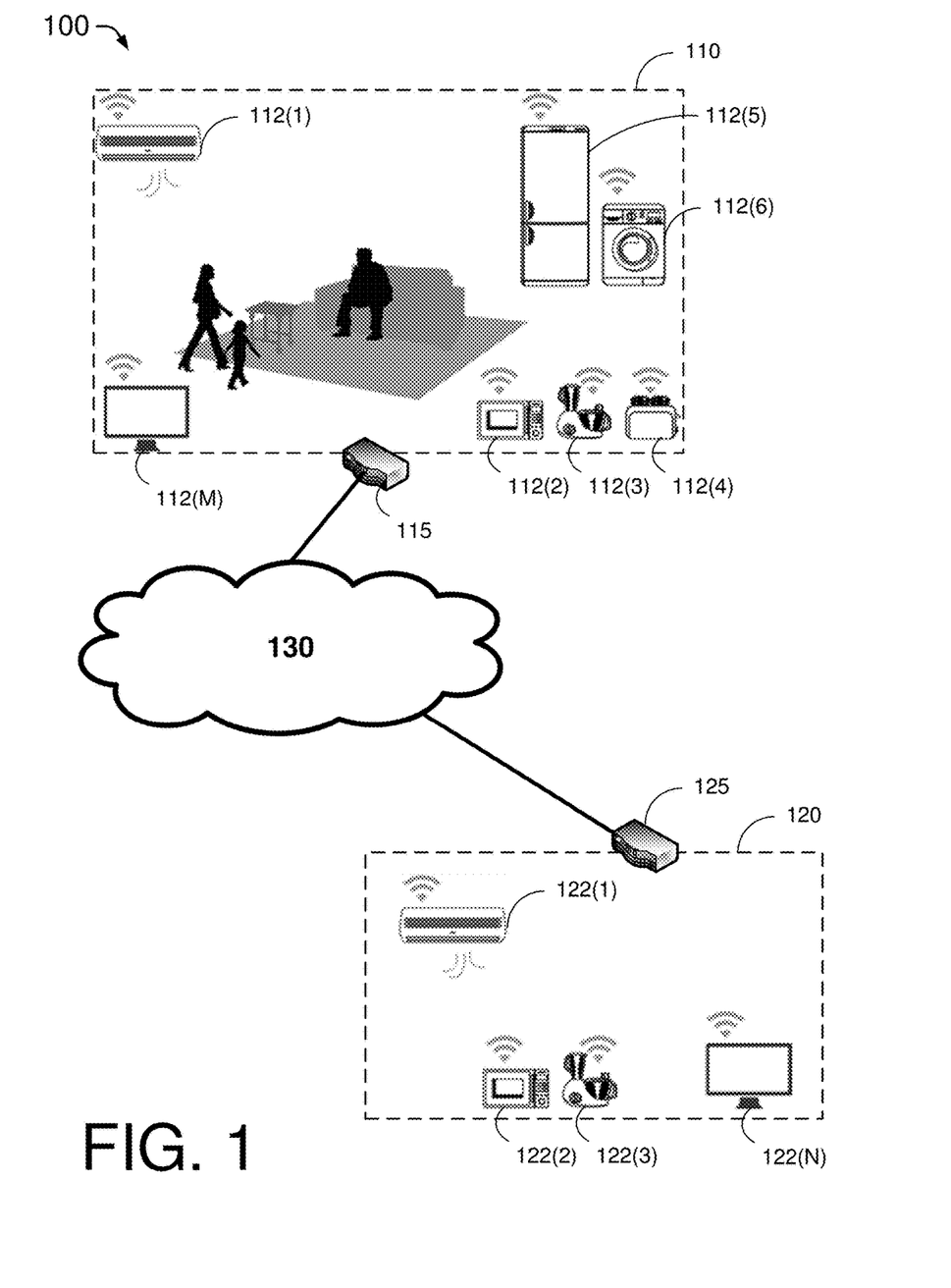
FIG. 1 is a diagram of an example environment in accordance with an implementation of the present disclosure.

FIG. 1 illustrates an example environment 100 in accordance with an implementation of the present disclosure.

Example environment 100 may include a first control apparatus 115 and a first plurality of networked devices 112(1)-112(M) which are associated with a first location 110, where M is a positive integer greater than one. As shown in FIG. 1, the first plurality of networked devices 112(1)-112(M) may be located at or within first location 110 (e.g., home), and may include, for example, an air conditioner, a microwave, a coffee maker, a toaster, a refrigerator, a dryer and a television. Each of the first plurality of networked devices 112(1)-112(M) is equipped with networking capability/functionality to allow it to communicate with first control apparatus 115 and/or with each other. First control apparatus 115 may be communicatively connected to one or more of the first plurality of networked devices 112(1)-112(M) wirelessly, e.g., via near field communication (NFC), Wi-Fi, Bluetooth and/or any suitable wireless protocols or standards. Additionally or alternatively, first control apparatus 115 may be communicatively connected to one or more of the first plurality of networked devices 112(1)-112(M) via a wired medium.

First control apparatus 115 may receive first recorded data from each of the first plurality of networked devices 112 (1)-112(M). The first recorded data may pertain to usage of the first plurality of networked devices 112(1)-112(M) during a first period of time, e.g., over 15 minutes, an hour, several hours, a day, several days, a week, several weeks or a month. First control apparatus 115 may also store the first recorded data. The first recorded data may include information such as, for example, a device identification of each of the first plurality of networked devices 112(1)-112(M), a user identification of one or more users each of whom uses one or more of the first plurality of networked devices 112(1)-112(M), operational parameters of each of the first plurality of networked devices 112(1)-112(M) during usage by any of the one or more users, time information indicative of time of usage of each of the first plurality of networked devices 112(1)-112(M) by any of the one or more users. The first recorded data may be stored in the JavaScript Object Notation (JSON) format.

Example environment 100 may also include a second control apparatus 125 and a second plurality of networked devices 122(1)-122(N) which are associated with a second location 120, where N is a positive integer greater than one and may be the same as or different than M. As shown in FIG. 1, the second plurality of networked devices 122(1)-122(N) may be located at or within second location 120 (e.g., hotel room, office or vacation home), and may include, for example, an air conditioner, a microwave, a coffee maker and a television. Each of the second plurality of networked devices 122(1)-122(N) is equipped with networking capability/functionality to allow it to communicate with second control apparatus 125 and/or with each other. Second control apparatus 125 may be communicatively connected to one or more of the second plurality of networked devices 122(1)-122(M) wirelessly, e.g., via NFC, Wi-Fi, Bluetooth and/or any suitable wireless protocols or standards. Additionally or alternatively, second control apparatus 125 may be communicatively connected to one or more of the second plurality of networked devices 122(1)-122(M) via a wired medium.

Second control apparatus 125 may receive second recorded data from each of the second plurality of networked devices 122(1)-122(M). The second recorded data may pertain to usage of the second plurality of networked devices 122(1)-122(M) during a second period of time, e.g., over 15 minutes, an hour, several hours, a day, several days, a week, several weeks or a month. Second control apparatus 125 may also store the second recorded data. The second recorded data may include information such as, for example, a device identification of each of the second plurality of networked devices 122(1)-122(N), a user identification of one or more users each of whom uses one or more of the second plurality of networked devices 122(1)-122(N), operational parameters of each of the second plurality of networked devices 122(1)-122(N) during usage by any of the one or more users, time information indicative of time of usage of each of the second plurality of networked devices 122(1)-122(M) by any of the one or more users. The second recorded data may be stored in the JSON format.

Example environment 100 may further include a network 130, which may be a combination of any number of local area networks (LANs), wide area networks (WANs), and metropolitan area networks (MANs) and the Internet. First control apparatus 115 may be communicatively connected to network 130 to receive data from and transmit data to network 130. Similarly, second control apparatus 125 may be communicatively connected to network 130 to receive data from and transmit data to network 130. Specifically, first control apparatus 115 may transmit the first recorded data pertaining to the first plurality of networked devices 112(1)-112(M) to second control apparatus 125 via network 130. First control apparatus 115 may also receive the second recorded data pertaining to the second plurality of networked devices 122(1)-122(N) from second control apparatus 125 via network 130. Likewise, second control apparatus 125 may transmit the second recorded data pertaining to the second plurality of networked devices 122(1)-122(N) to first control apparatus 115 via network 130. Second control apparatus 125 may also receive the first recorded data pertaining to the first plurality of networked devices 112(1)-112(M) from first control apparatus 115 via network 130.

First control apparatus 115 may, at a third period of time after the first period of time, apply the first recorded data received from the first plurality of networked devices 112 (1)-112(M) regarding operations of the first plurality of networked devices 112(1)-112(M) during the first period of time. First control apparatus 115 may also apply at least a portion of the second recorded data to at least one of the first plurality of networked devices 112(1)-112(M) during the third period of time or some other time.

Second control apparatus 125 may, at a fourth period of time after the second period of time, apply the second recorded data received from the second plurality of networked devices 122(1)-122(N) regarding operations of the second plurality of networked devices 122(1)-122(N) during the second period of time. Second control apparatus 125 may also apply at least a portion of the first recorded data to at least one of the second plurality of networked devices 122(1)-122(N) during the fourth period of time or some other time.

For simplicity, description below pertaining to the first control apparatus 115, the first plurality of networked devices 112(1)-112(M) and the first recorded data is equally applicable to the second control apparatus 125, the second plurality of networked devices 122(1)-122(N) and the second recorded data. Similarly, for simplicity, description below pertaining to the second control apparatus 125, the second plurality of networked devices 122(1)-122(N) and the second recorded data is equally applicable to the first control apparatus 115, the first plurality of networked devices 112(1)-112(M) and the first recorded data.

Prior to applying at least a portion of the first recorded data or second recorded data, first control apparatus 115 may first detect a presence of a first user of one or more users (e.g., the mom or dad of a household) at the first location 110. Upon detecting the presence of the first user, first control apparatus 115 applies at least a portion of the first recorded data or second recorded data which is associated with the first user, e.g., operational parameters of one or more of the first plurality of networked devices 112(1)-112 (M) or one or more of the second plurality of networked devices 122(1)-122(N) operating in conditions suitable for the lifestyle of the first user.

First control apparatus 115 may, prior to applying at least a portion of the first recorded data or second recorded data, request an input from the first user. For instance, the first user may make entry of the input via a portable device which is operated by the first user and communicatively connected to first control apparatus 115. Alternatively, first control apparatus 115 may include a user interface through which the first user may make entry for the input. Upon receiving the input from the first user, first control apparatus 115 may apply at least a portion of the first recorded data or second recorded data which pertains to the lifestyle of the first user. For instance, the first user may indicate in the input the desire to apply lifestyle related data, which was recorded at home, to one or more networked devices at a hotel room, office or a vacation home. Alternatively, upon receiving the input from the first user, first control apparatus 115 may apply no portion or a different portion of the first recorded data or second recorded data. For instance, the first user may indicate in the input desire to apply no lifestyle related data or different lifestyle related data, which was recorded at a friend's home, to one or more networked devices at home, a hotel room, office or a vacation home.

First control apparatus 115 may upload, via network 130, the first recorded data to an online account of the first user such that the first recorded data may be accessible later by first control apparatus 115 as well as one or more other control apparatuses, e.g., second control apparatus 125, by downloading the data from the online account of the first user. In an example scenario of applying the first recorded data to the second plurality of networked devices 122(1)-122(N), second control apparatus 125 may first detect or otherwise determine a presence of the first user proximate or at the second location 120. Then, second control apparatus 126 may download the first recorded data from the online account of the first user, and provide at least a portion of the first recorded data to one or more of the second plurality of networked devices 122(1)-122(N) to enable the one or more networked devices to operate according to the first recorded data.

When receiving the first recorded data, first control apparatus 115 may receive a plurality of sets of recorded data during the first period of time. First control apparatus 115 may identify a temporal pattern of recorded data in the plurality of sets of recorded data. For instance, first control apparatus 115 may identify a time-based pattern in the lifestyle of the first user indicating that, during the weekends when the first user is typically home, the air conditioner is turned on approximately around 2:00 PM when the outside ambient temperature has been heated up by the sun and turned off approximately around 9:30 PM after the heat in the ambience has begun to dissipate after sunset, and that, on weekdays when the first user is typically in the office during the day, the air conditioner is not turned on at all or is only turned on for a short period of time in the evening. First control apparatus 115 may apply the temporal pattern of the recorded data to the first plurality of networked devices 112(1)-112(M) during a later period of time.

The first plurality of networked devices 112(1)-112(M) may automatically record operational parameters thereof and optionally other information (together referred to as "recorded data" herein) without user intervention. That is, it would not be necessary for user(s) of the first plurality of networked devices 112(1)-112(M) to take any action to have operational parameters of one or more of the first plurality of networked devices 112(1)-112(M) recorded. Alternatively, rather than recording such data at and by the first plurality of networked devices 112(1)-112(M) themselves, the first plurality of networked devices 112(1)-112(M) may stream such data to first control apparatus 115 for recording or storage.

Prior to the first user relocating to the second location 120, second control apparatus 125 may receive information indicating an arrival time at the second location 120 by the first user. For instance, the second location 120 may be a hotel. Upon the first user booking a room at the hotel, second control apparatus 120 may receive booking information indicative of the arrival time and date with respect to the first user. Before the arrival time, second control apparatus 125 may transmit the first recorded data to the one or more of the second plurality of networked devices 122(1)-122(N) and trigger the one or more of the second plurality of networked devices 122(1)-122(N) to begin to operate according to the first recorded data no later than the arrival time.

Prior to applying any portion of the first recorded data or the second recorded data, first control apparatus 115 may request an input from the first user to indicate whether or not to apply the first or second recorded data to any of the first plurality of networked devices 112(1)-112(M). For instance, first control apparatus 115 may transmit a signal to a portable device of the first user to cause a mobile app on the portable device to pop up the request for the first user to make input. Upon receiving the input from the first user, first control apparatus 115 may determine whether and how to apply the first recorded data or the second recorded data to any of the first plurality of networked devices 112(1)-112(M), and apply none or at least a portion of the first recorded data or the second recorded data based on the result of the determination.

Figure 2:
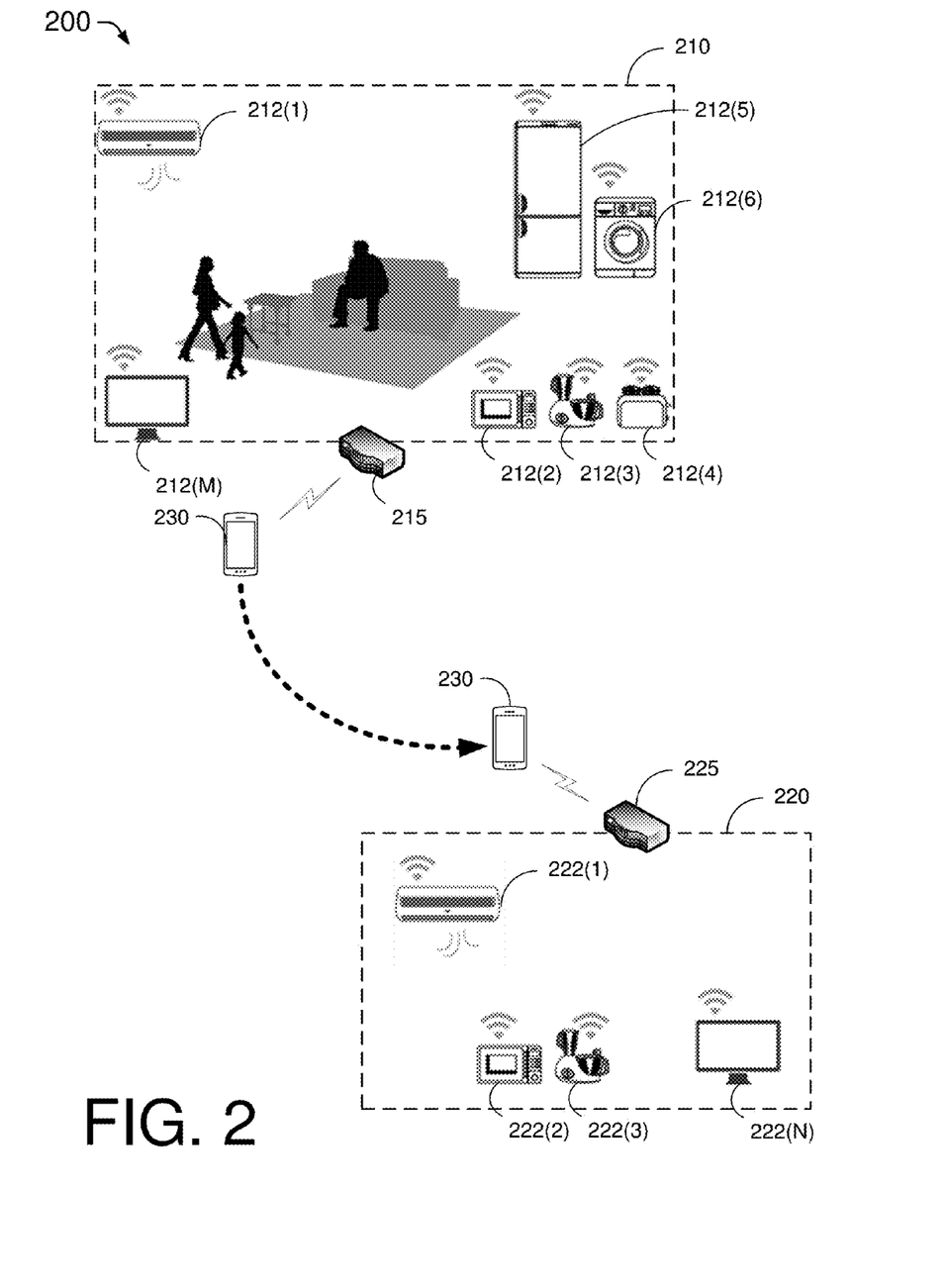
FIG. 2 is a diagram of an example environment in accordance with another implementation of the present disclosure.

FIG. 2 illustrates an example environment 200 in accordance with another implementation of the present disclosure.

Example environment 200 may include a first control apparatus 215 communicatively connected to a first plurality of networked devices 212(1)-212(M) which are associated with a first location 210, where M is a positive integer greater than one. As shown in FIG. 2, the first plurality of networked devices 212(1)-212(M) may be located at or within first location 210 (e.g., home), and may include, for example, an air conditioner, a microwave, a coffee maker, a toaster, a refrigerator, a dryer and a television. Example environment 200 may also include a second control apparatus 225 communicatively connected to a second plurality of networked devices 222(1)-222(N) which are associated with a second location 220, where N is a positive integer greater than one and may be the same as or different than M. As shown in FIG. 2, the second plurality of networked devices 222(1)-222(N) may be located at or within second location 220 (e.g., hotel room, office or vacation home), and may include, for example, an air conditioner, a microwave, a coffee maker and a television.

First control apparatus 215 and second control apparatus 225 of example environment 200 may be similar or identical to first control apparatus 115 and second control apparatus 125 of example environment 100, respectively. Each of the first plurality of networked devices 212(1)-212(M) of example environment 200 may be similar or identical to the first plurality of networked devices 112(1)-112(M) of example environment 100. Each of the second plurality of networked devices 222(1)-222(N) of example environment 200 may be similar or identical to the first plurality of networked devices 122(1)-122(N) of example environment 100. Thus, in the interest of brevity, description of example environment 200 is directed to differences between example environment 200 and example environment 100.

Different from example environment 100, in example environment 200 the first recorded data may be provided from first control apparatus 215 to second control apparatus 225, and the second recorded data may be provided from second control apparatus 225 to first control apparatus 215, by way of a portable device 230 of a user. Portable device 230 may be a smartphone, a smartwatch, a wearable computing device, a tablet computer, a laptop computer, a notebook computer, a personal digital assistant (PDA) or the like. Portable device 230 may be communicatively connected to first control apparatus 215 and second control apparatus 225 wirelessly, e.g., in accordance with at least one of a plurality of wireless standards such as NFC, Wi-Fi, Bluetooth and any suitable wireless protocols or standards currently existing and yet to be developed. That is, first control apparatus 215 may wirelessly transmit first recorded data to portable device 230 and wirelessly receive second recorded data from portable device 230 when portable device 230 is in the proximity or in a wireless communication range of first control apparatus 215. Likewise, second control apparatus 225 may wirelessly transmit second recorded data to portable device 230 and wirelessly receive first recorded data from portable device 230 when portable device 230 is in the proximity or in a wireless communication range of second control apparatus 225. Accordingly, the first recorded data and/or the second recorded data may be stored in portable device 230. For instance, first control apparatus 215 may first store first recorded data and then transmit the first recorded data to portable device 230. Similarly, second control apparatus 225 may first store second recorded data and then transmit the second recorded data to portable device 230.

To apply the first recorded data to one or more of the second plurality of networked devices 222(1)-222(N) of the second location 220, second control apparatus 225 may first receive the first recorded data from portable device 230. Subsequently, second control apparatus 225 may transmit at least a portion of the first recorded data to the one or more of the second plurality of networked devices 222(1)-222(N). Second control apparatus 225 may cause the one or more of the second plurality of networked devices 222(1)-222(N) to operate according to the respective portion of the first recorded data, for example, by transmitting a signal to trigger the one or more networked devices to begin operating according to the respective portion of the first recorded data at a given time.

Likewise, to apply the second recorded data to one or more of the first plurality of networked devices 212(1)-212(M) of the first location 210, first control apparatus 215 may first receive the second recorded data from portable device 230. Subsequently, first control apparatus 215 may transmit at least a portion of the second recorded to the one or more of the first plurality of networked devices 212(1)-212(M). First control apparatus 215 may cause the one or more of the first plurality of networked devices 212(1)-212(M) to operate according to the respective portion of the second recorded data, for example, by transmitting a signal to trigger the one or more networked devices to begin operating according to the respective portion of the second recorded data at a given time.

Example Implementations

Figure 3:
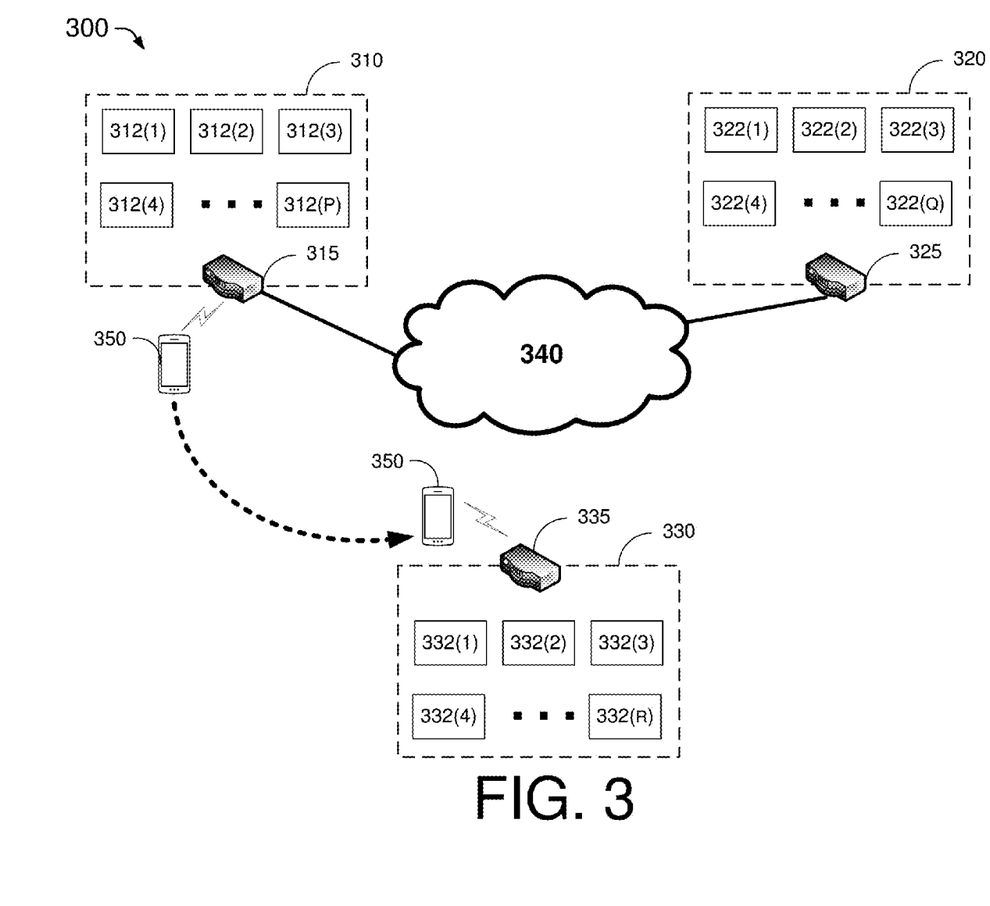
FIG. 3 is a diagram of an example system in accordance with an implementation of the present disclosure.

FIG. 3 illustrates an example system 300 in accordance with an implementation of the present disclosure.

Example system 300 may include a first control apparatus 315 communicatively connected to a first plurality of networked devices 312(1)-312(P) which are associated with a first location 310, where P is a positive integer greater than one. As shown in FIG. 3, the first plurality of networked devices 312(1)-312(P) may be located at or within first location 310 (e.g., home). Example system 300 may also include a second control apparatus 325 communicatively connected to a second plurality of networked devices 322(1)-322(Q) which are associated with a second location 320, where Q is a positive integer greater than one and may be the same as or different than P. As shown in FIG. 3, the second plurality of networked devices 322(1)-322(Q) may be located at or within second location 320 (e.g., hotel room, office or vacation home). Example system 300 may optionally include one or more additional control apparatuses each of which communicatively connected to respective plurality of networked devices associated with a respective location. For illustrative purpose, FIG. 3 shows that example system 300 further includes a third control apparatus 335 communicatively connected to a third plurality of networked devices 332(1)-332(R) which are associated with a third location 330, where R is a positive integer greater than one and may be the same as or different than P and Q. The third plurality of networked devices 332(1)-332(R) may be located at or within third location 330 (e.g., hotel room, office or vacation home).

First control apparatus 315, second control apparatus 325 and third control apparatus 335 of example system 300 may be similar or identical to any of first control apparatus 115, second control apparatus 125, first control apparatus 215 and second control apparatus 225 of example environment 100 and example environment 200, respectively. Each of the first plurality of networked devices 312(1)-312(P), each of the second plurality of networked devices 322(1)-322(Q) and each of the third plurality of networked devices 332(1)-331(R) of example system 300 may be similar or identical to a respective one of the networked devices of example environment 100 and example environment 200. Thus, in the interest of brevity, an overview description in lieu of a detailed description of components of example system 300 is provided below.

As shown in FIG. 3, first control apparatus 315 and second control apparatus 325 may be communicatively connected to network 340, which may be a combination of any number of LANs, WANs, MANs and the Internet. First control apparatus 315 may be communicatively connected to network 340 to receive data from and transmit data to network 340. Similarly, second control apparatus 325 may be communicatively connected to network 340 to receive data from and transmit data to network 340. Specifically, first control apparatus 315 may transmit the first recorded data pertaining to the first plurality of networked devices 312(1)-312(P) to second control apparatus 325 via network 340. First control apparatus 315 may also receive the second recorded data pertaining to the second plurality of networked devices 322(1)-322(Q) from second control apparatus 325 via network 340. Likewise, second control apparatus 325 may transmit the second recorded data pertaining to the second plurality of networked devices 322(1)-322(Q) to first control apparatus 315 via network 340. Second control apparatus 325 may also receive the first recorded data pertaining to the first plurality of networked devices 312(1)-312(P) from first control apparatus 315 via network 340.

In example system 300 the first recorded data may be provided from first control apparatus 315 to third control apparatus 335, and the third recorded data may be provided from third control apparatus 335 to first control apparatus 315, by way of a portable device 350 of a user. Portable device 350 may be a smartphone, a smartwatch, a wearable computing device, a tablet computer, a laptop computer, a notebook computer, a PDA or the like. Portable device 350 may be communicatively connected to first control apparatus 315 and third control apparatus 335 wirelessly, e.g., in accordance with at least one of a plurality of wireless standards such as NFC, Wi-Fi, Bluetooth and any suitable wireless protocols or standards currently existing and yet to be developed. That is, first control apparatus 315 may wirelessly transmit first recorded data to portable device 350 and wirelessly receive third recorded data from portable device 350 when portable device 350 is in the proximity or in a wireless communication range of first control apparatus 315. Likewise, third control apparatus 335 may wirelessly transmit third recorded data to portable device 350 and wirelessly receive first recorded data from portable device 350 when portable device 350 is in the proximity or in a wireless communication range of third control apparatus 335. Accordingly, the first recorded data and/or the third recorded data may be stored in portable device 350. For instance, first control apparatus 315 may first store first recorded data and then transmit the first recorded data to portable device 350. Similarly, third control apparatus 335 may first store third recorded data and then transmit the third recorded data to portable device 350.

Figure 4:
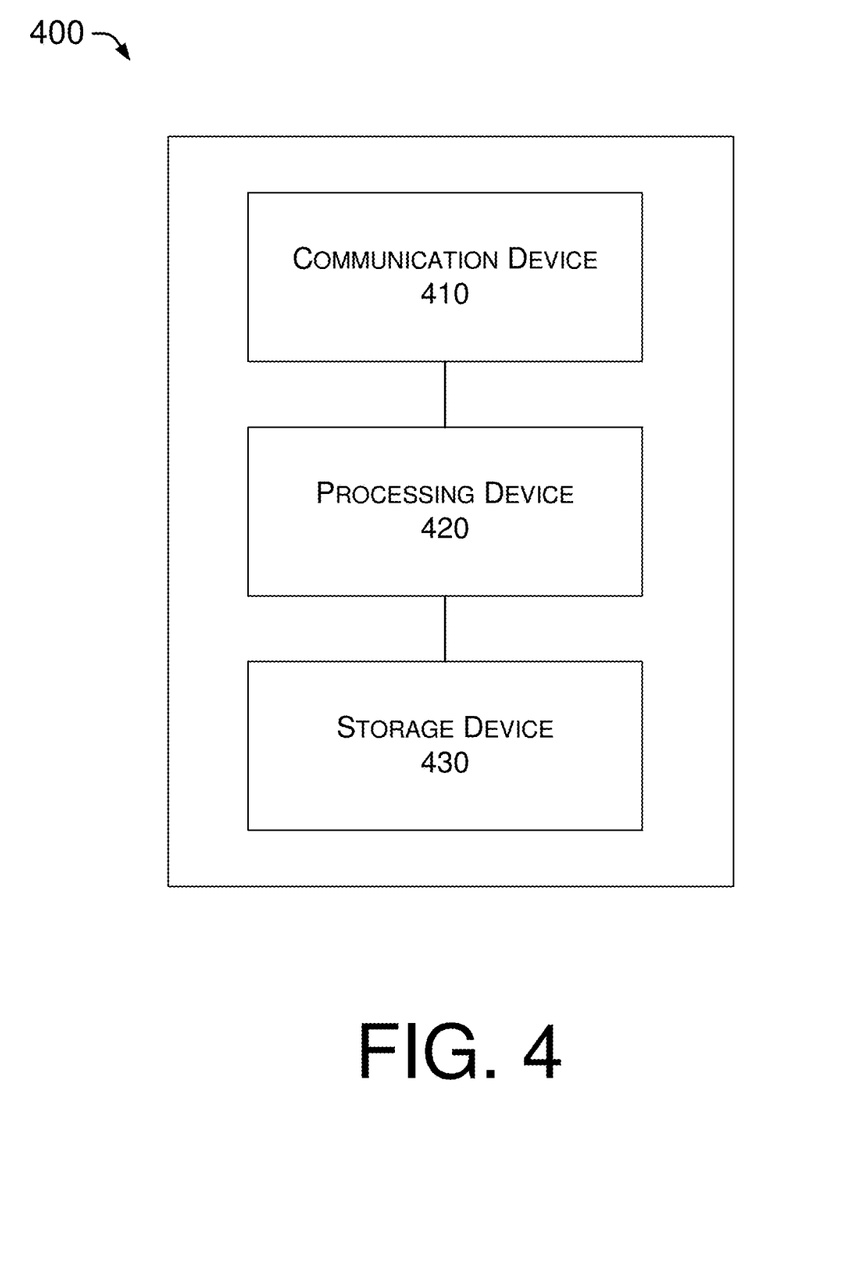
FIG. 4 is a block diagram of an example apparatus in accordance with an implementation of the present disclosure.

FIG. 4 illustrates an example control apparatus 400 configured to implement techniques, methods and systems in accordance with an implementation of the present disclosure.

Example control apparatus 400 may perform various functions related to techniques, methods and systems described herein. In some implementations, example control apparatus 400 may include at least those components shown in FIG. 4, such as a communication device 410, a processing device 420 and a storage device 430. Although communication device 410, processing device 420 and storage device 430 are depicted as discrete components separate from each other, in various implementations some or all of communication device 410, processing device 420 and storage device 430 may be integral parts of a single module in the form of an integrated circuit (IC), chip or chipset. Each of communication device 410, processing device 420 and storage device 430 may be implemented in the form of a physical circuit (and optional firmware, middleware, software, or any combination thereof) configured to perform the respective function(s) described herein.

Communication device 410 may be configured to receive first recorded data from a first plurality of networked devices associated with a first location. The first recorded data may pertain to usage of one or more of a first plurality of networked devices during a first period of time. Communication device 410 may also be configured to receive second recorded data pertaining to usage of one or more of a second plurality of networked devices associated with a second location.

Storage device 430 may be configured to store the first recorded data and the second recorded data. Storage device 430 may also be configured to store one or more sets of processor-executable instructions. The one or more sets of processor-executable instructions may be firmware, middleware, software or any combination thereof. Storage device 430 may be in the form of any combination of one or more computer-usable or non-transitory computer-readable media. For example, storage device 430 may be in the form of one or more of a removable computer diskette, a hard disk, a random access memory (RAM) device, a read-only memory (ROM) device, an erasable programmable read-only memory (EPROM or Flash memory) device, a removable compact disc read-only memory (CDROM), an optical storage device, a magnetic storage device, or any suitable storage device. Computer program code for carrying out operations of the present disclosure may be written in any combination of one or more programming languages. Such code, or processor-executable instruction, may be compiled from source code to computer-readable assembly language or machine code suitable for the device or computer on which the code will be executed.

Processing device 420 may be coupled to storage device 430 and communication device 410. Processing device 420 may be configured to apply the first recorded data to one or more of the first plurality of networked devices during a second period of time different than the first period of time. Processing device 420 may also be configured to apply at least a portion of the second recorded data to at least one of the first plurality of networked devices during a third period of time different than the first period of time.

In at least some implementations, communication device 410 may be configured to wirelessly receive the second recorded data from a portable device.

In at least some implementations, in applying at least a portion of the second recorded data to the at least one of the first plurality of networked devices during the third period of time, processing device 420 may be configured to cause the communication device 410 to transmit at least the portion of the second recorded data to the at least one of the first plurality of networked devices prior to the third period of time. Processing device 420 may also be configured to trigger the at least one of the first plurality of networked devices to begin to operate according to at least the portion of the second recorded data no later than a beginning of the third period of time.

Figure 5:
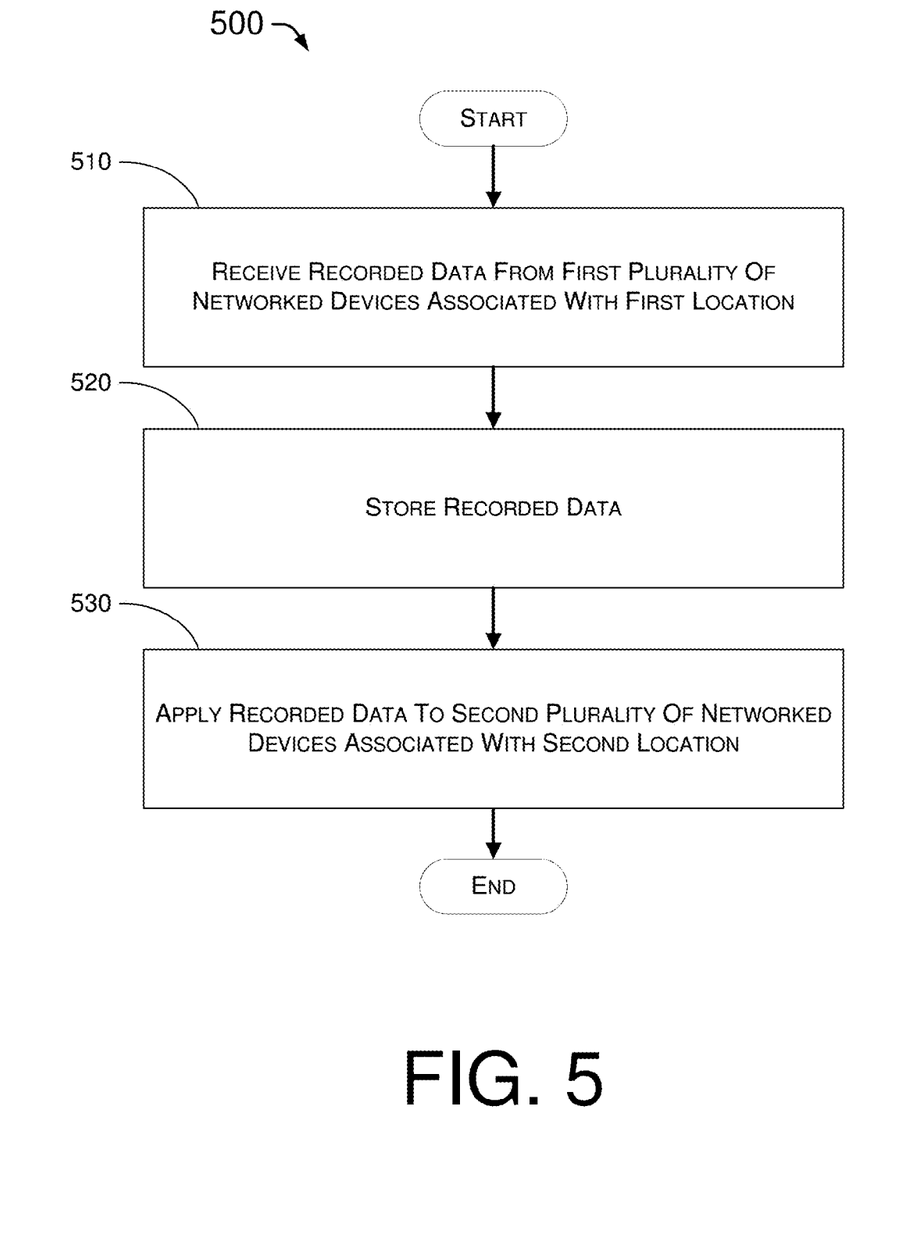
FIG. 5 is a flowchart of an example process of an example apparatus in accordance with an implementation of the present disclosure.

FIG. 5 illustrates an example process 500 of an example apparatus in accordance with an implementation of the present disclosure.

Example process 500 may include one or more operations, actions, or functions as illustrated by one or more of blocks 510, 520 and 530. Although illustrated as discrete blocks, various blocks may be divided into additional blocks, combined into fewer blocks, or eliminated, depending on the desired implementation. Example process 500 may be implemented by first control apparatus 115, second control apparatus 125, first control apparatus 215, second control apparatus 225, first control apparatus 315, second control apparatus 325, third control apparatus 335 and example control apparatus 400. For illustrative purposes, the operations described below are performed by example control apparatus 400. Example process 500 may begin at block 510.

Block 510 (Receive Recorded Data From First Plurality Of Networked Devices Associated With First Location) may refer to example control apparatus 400 receiving recorded data from each of a first plurality of networked devices associated with a first location. The recorded data may pertain to usage of one or more of the first plurality of networked devices during a first period of time. Block 510 may be followed by block 520.

Block 520 (Store Recorded Data) may refer to example control apparatus 400 storing the recorded data. Block 520 may be followed by block 530.

Block 530 (Apply Recorded Data To Second Plurality Of Networked Devices Associated With Second Location) may refer to example control apparatus 400 applying the recorded data to one or more of a second plurality of networked devices associated with a second location different than the first location.

In at least some implementations, the recorded data may include a device identification of each of the first plurality of networked devices, a user identification of one or more users each of whom uses one or more of the first plurality of networked devices, operational parameters of each of the first plurality of networked devices during usage by any of the one or more users, time information indicative of time of usage of each of the first plurality of networked devices by any of the one or more users, or any combination of the above information.

In at least some implementations, in applying the recorded data, example process 500 may involve example control apparatus 400 determining a presence of a first user of one or more users and applying at least a portion of the recorded data which is associated with the first user.

In at least some implementations, in applying at least a portion of the recorded data which is associated with the first user, example process 500 may involve example control apparatus 400 performing the following operations: prior to the applying, requesting an input from the first user; receiving the input from the first user; applying at least the portion of the recorded data which is associated with the first user responsive a first indication in the input; and applying no portion or a different portion of the recorded data responsive to a second indication in the input.

In at least some implementations, example process 500 may involve example control apparatus 400 storing the recorded data in the JSON format.

In at least some implementations, example process 500 may involve example control apparatus 400 storing the recorded data in an online account of a user. In at least some implementations, in applying the recorded data, example process 500 may involve example control apparatus 400 performing the following operations: determining a presence of the user proximate or at the second location; and providing the recorded data to the second plurality of networked devices to enable the second plurality of networked devices to operate according to the recorded data.

In at least some implementations, example process 500 may involve example control apparatus 400 storing the recorded data in a portable device.

In at least some implementations, in storing the recorded data in the portable device, example process 500 may involve example control apparatus 400 performing the following operations: storing the recorded data in a control apparatus; and transmitting the recorded data to the portable device from the control apparatus. Alternatively, in storing the recorded data in the portable device, example process 500 may involve example control apparatus 400 directly transmitting the recorded data to the portable device for storing the recorded data in the portable device. In at least some implementations, in transmitting the recorded data to the portable device, example process 500 may involve example control apparatus 400 wirelessly transmitting the recorded data to the portable device. In at least some implementations, example process 500 may involve example control apparatus 400 transmitting the recorded data in accordance with at least one of a plurality of wireless standards including NFC, Wi-Fi and Bluetooth.

In at least some implementations, in applying the recorded data to one or more of the second plurality of networked devices of the second location, example process 500 may involve example control apparatus 400 performing the following operations: receiving, by a control apparatus associated with the second location, the recorded data from the portable device; transmitting, by the control apparatus associated with the second location, the recorded data to the one or more of the second plurality of networked devices; and causing, by the control apparatus associated with the second location, the one or more of the second plurality of networked devices to operate according to the recorded data.

In at least some implementations, in receiving the recorded data, example process 500 may involve example control apparatus 400 performing the following operations: receiving a plurality of sets of recorded data during a first period of time; and identifying a temporal pattern of recorded data in the plurality of sets of recorded data.

In at least some implementations, example process 500 may further involve example control apparatus 400 applying the temporal pattern of recorded data to the first plurality of networked devices or the second plurality of networked devices during a second period of time which is after the first period of time.

In at least some implementations, example process 500 may further involve example control apparatus 400 automatically recording operational parameters of the first plurality of networked devices without user intervention. In receiving the recorded data from each of the first plurality of networked devices, example process 500 may involve example control apparatus 400 receiving the recorded operational parameters of the first plurality of networked devices as the recorded data.

In at least some implementations, example process 500 may further involve example control apparatus 400 receiving information indicating an arrival time at the second location by a user. In applying the recorded data to one or more of the second plurality of networked devices of the second location, example process 500 may involve example control apparatus 400 performing the following operations: transmitting the recorded data to the one or more of the second plurality of networked devices prior to the arrival time; and triggering the one or more of the second plurality of networked devices to begin to operate according to the recorded data no later than the arrival time.

In at least some implementations, example process 500 may further involve example control apparatus 400 performing the following operations: requesting an input from a user to indicate whether or not to apply the recorded data to any of the first plurality of networked devices or any of the second plurality of networked devices; receiving the input from the user; determining whether and how to apply the recorded data to any of the first plurality of networked devices or any of the second plurality of networked devices responsive to receiving the input; and applying the recorded data based on the determining.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving, by a processing device of a first control apparatus which is communicatively coupled to a first plurality of networked devices via a communication device of the first control apparatus, recorded data from each of a first plurality of networked devices associated with a first location, the recorded data pertaining to usage of one or more of the first plurality of networked devices during a first period of time;

storing, by the processing device, the recorded data in a storage device of the first control apparatus; and applying, by the processing device during a second period of time which is after the first period of time, the recorded data to at least a first networked device of the first plurality of networked devices to set one or more operational parameters of the first networked device such that the first networked device operates during the second period of time in a condition suitable for a user according to usage of the first networked device by the user during the first period of time.

2. The method of claim 1, wherein the recorded data comprises a device identification of each of the first plurality of networked devices, a user identification of one or more users each of whom uses one or more of the first plurality of networked devices, operational parameters of each of the first plurality of networked devices during usage by any of the one or more users, time information indicative of time of usage of each of the first plurality of networked devices by any of the one or more users, or a combination thereof.

3. The method of claim 1, wherein the applying of the recorded data comprises:
determining a presence of the user; and
applying at least a portion of the recorded data which is associated with the user.

4. The method of claim 3, wherein the applying of at least a portion of the recorded data which is associated with the user comprises:
prior to the applying, requesting an input from the user;
receiving the input from the user;
applying at least the portion of the recorded data which is associated with the user responsive a first indication in the input; and
applying no portion or a different portion of the recorded data responsive to a second indication in the input.

5. The method of claim 1, wherein the storing of the recorded data comprises storing the recorded data in a JavaScript Object Notation (JSON) format.

6. The method of claim 1, wherein the storing of the recorded data comprises storing the recorded data in an account of the user.

7. The method of claim 6, wherein the applying of the recorded data comprises:
determining a presence of the user proximate or at the second location; and
providing the recorded data to the second plurality of networked devices to enable the second plurality of networked devices to operate according to the recorded data.

8. The method of claim 1, wherein the storing of the recorded data comprises storing the recorded data in a portable device.

9. The method of claim 8, wherein the storing of the recorded data in the portable device comprises transmitting the recorded data to the portable device for storing the recorded data in the portable device.

10. The method of claim 9, wherein the transmitting of the recorded data to the portable device comprises wirelessly transmitting the recorded data to the portable device.

11. The method of claim 10, wherein the wirelessly transmitting of the recorded data comprises transmitting the recorded data in accordance with at least one of a plurality of wireless standards comprising near field communication (NFC), Wi-Fi and Bluetooth.

12. The method of claim 8, wherein the applying of the recorded data to one or more of the second plurality of networked devices of the second location comprises:
receiving, by a control apparatus associated with the second location, the recorded data from the portable device;
transmitting, by the control apparatus associated with the second location, the recorded data to the one or more of the second plurality of networked devices; and
causing, by the control apparatus associated with the second location, the one or more of the second plurality of networked devices to operate according to the recorded data.

13. The method of claim 1, wherein the receiving of the recorded data comprises:
receiving a plurality of sets of recorded data during the first period of time; and
identifying a temporal pattern of recorded data in the plurality of sets of recorded data.

14. The method of claim 13, further comprising:
applying the temporal pattern of recorded data to the first plurality of networked devices or the second plurality of networked devices during the second period of time which is after the first period of time.

15. The method of claim 1, further comprising:
automatically recording operational parameters of the first plurality of networked devices without user intervention,
wherein the receiving of the recorded data from each of the first plurality of networked devices comprises receiving, by the first control apparatus, the recorded operational parameters of the first plurality of networked devices as the recorded data.

16. The method of claim 12, further comprising:
receiving information indicating an arrival time at the second location by the user,
wherein the applying of the recorded data to one or more of the second plurality of networked devices comprises:
transmitting the recorded data to the one or more of the second plurality of networked devices prior to the arrival time; and
triggering the one or more of the second plurality of networked devices to begin to operate according to the recorded data no later than the arrival time.

17. The method of claim 1, further comprising:
requesting an input from the user to indicate whether or not to apply the recorded data to any of the first plurality of networked devices or any of the second plurality of networked devices;
receiving the input from the user;
determining whether and how to apply the recorded data to any of the first plurality of networked devices or any of the second plurality of networked devices responsive to receiving the input; and
applying the recorded data based on the determining.

18. An apparatus, comprising:
a communication device that, during operation, performs acts comprising:
receiving first recorded data from a first plurality of networked devices associated with a first location, the first recorded data pertaining to usage of one or more of the first plurality of networked devices during a first period of time; and
receiving second recorded data pertaining to usage, during a second period of time, of one or more of a second plurality of networked devices associated with a second location;

a storage device that, during operation, stores at least the first recorded data; and a processing device coupled to the storage device and the communication device, wherein during operation the processing device performs acts comprising:

applying the first recorded data to at least a first networked device of the first plurality of networked devices during a third period of time different than the first period of time to set one or more operational parameters of the first networked device such that the first networked device operates during the third period of time in a condition suitable for a user according to usage of the first networked device by the user during the first period of time and at the first location; and applying at least a portion of the second recorded data to at least a second networked device of the first plurality of networked devices to set one or more operational parameters of the second networked device such that the second networked device operates during the third period of time in a condition suitable for the user according to usage of at least one of the second plurality of networked devices by the user during the second period of time and at the second location.

19. The apparatus of claim 18, wherein, in receiving the second recorded data, the communication device wirelessly receives the second recorded data from a portable device.

20. The apparatus of claim 18, wherein the first recorded data comprises a device identification of each of the first plurality of networked devices, a user identification of one or more users each of whom uses one or more of the first plurality of networked devices, operational parameters of each of the first plurality of networked devices during usage by any of the one or more users, time information indicative of time of usage of each of the first plurality of networked devices by any of the one or more users, or a combination thereof.

21. A system, comprising:

a first control apparatus comprising at least a first processing device and a first communication device, wherein the first communication device receives first recorded data from a first plurality of networked devices associated with a first location; and a second control apparatus comprising at least a second processing device and a second communication device, wherein the second communication device receives second recorded data from a second plurality of networked devices associated with a second location, wherein:

the first recorded data pertains to usage of one or more of the first plurality of networked devices during a first period of time, the second recorded data pertains to usage of one or more of the second plurality of networked devices during a second period of time, the first processing device of the first control apparatus receives, via the first communication device, the second recorded data from the second communication device of the second control apparatus, the second processing device of the second control apparatus receives, via the second communication device, the first recorded data from the first communication device of the first control apparatus, the first processing device performs either or both of:

applying, during a third period of time which is after the first period of time and the second period of time, the recorded data to at least a first networked device of the first plurality of networked devices to set one or more operational parameters of the first networked device such that the first networked device operates during the third period of time in a condition suitable for a user according to usage of the first networked device by the user during the first period of time and at the first location; and applying, during the third period of time, at least a portion of the second recorded data to at least a second networked device of the first plurality of networked devices to set one or more operational parameters of the second networked device such that the second networked device operates during the third period of time in a condition suitable for the user according to usage of at least one of the second plurality of networked devices by the user during the second period of time and at the second location.

22. The system of claim 21, wherein the first recorded data comprises a device identification of each of the first plurality of networked devices, a user identification of one or more users each of whom uses one or more of the first plurality of networked devices, operational parameters of each of the first plurality of networked devices during usage by any of the one or more users, time information indicative of time of usage of each of the first plurality of networked devices by any of the one or more users, or a combination thereof.

* * * * *